United States Patent [19]

Frias et al.

[11] 4,322,158
[45] Mar. 30, 1982

[54] THERMAL FILM DEVELOPMENT APPARATUS

[75] Inventors: Ronald J. Frias, Milwaukee; Roger A. Gross, Hartford; David Jagielski, Kewaskum, all of Wis.

[73] Assignee: Micron Corporation, Iron Ridge, Wis.

[21] Appl. No.: 116,922

[22] Filed: Jan. 30, 1980

[51] Int. Cl.³ .......................... G03B 27/52; H05B 1/00
[52] U.S. Cl. ...................................... 355/27; 354/299; 219/216; 219/388
[58] Field of Search .................. 354/299, 297; 355/27, 355/100, 106, 28; 219/216, 388; 432/60

[56] References Cited

U.S. PATENT DOCUMENTS

| | | | |
|---|---|---|---|
| 3,311,040 | 3/1967 | Ishikawa | 354/299 |
| 3,575,580 | 4/1971 | Anderson | 219/216 |
| 3,629,549 | 12/1971 | Svendsen | 354/299 |
| 3,666,247 | 5/1972 | Banks | 432/60 |
| 3,669,707 | 6/1972 | Donnelly et al. | 432/60 |
| 3,725,639 | 4/1973 | Seil et al. | 219/216 |
| 3,739,143 | 6/1973 | Amundson et al. | 219/216 |
| 3,877,805 | 4/1975 | Heldenbrand et al. | 355/27 |
| 3,922,083 | 11/1975 | Freeman et al. | 355/27 |
| 3,991,483 | 11/1976 | Knechtel et al. | 219/216 |
| 4,087,676 | 5/1978 | Fukase | 219/216 |
| 4,114,021 | 9/1978 | Nishide et al. | 219/216 |

*Primary Examiner*—Lawrence R. Franklin
*Assistant Examiner*—Alan Mathews
*Attorney, Agent, or Firm*—Andrus, Sceales, Starke & Sawall

[57] ABSTRACT

A compact thermal developer is mounted in a microfiche reader printer. The developer is a two-stage unit having a pair of roller-heater units located to pass on exposed copy sheet in one direction through succeeding stages in an over-and-under movement to develop the copy and produce a flat hard copy. Each roller-heater unit includes a roller having an outer thin friction coating rotatably supported within an arcuate recess portion of a heater bar. The heater bar and roller are arranged with roller biased toward the heater to grasp the copy sheet. The roller includes a thin aluminum tube supported by heat insulating end members mounted on a shaft with a floating connection to support the tube with a permission relative axial movement to compensate for different coefficients of thermal expansion. A thin silicone rubber coating on the tube establishes positive sheet movement while providing sufficient thermal transmission to present a thermally light background member. The roller-heater units shafts are mounted in plastic end caps supports. The microfiche reader includes a double-faced mirror unit pivotally mounted to transmit the microfiche image onto a front viewing screen or alternately to an exposure frame structure. A small mirror is pivoted from the image path in the alternate position. A copy paper roll is coupled to powered transfer and cutter assembly for moving the paper into and from the exposure frame to the developer.

22 Claims, 10 Drawing Figures

FIG. 8

THERMAL FILM DEVELOPMENT APPARATUS

BACKGROUND OF THE INVENTION

This invention relates to a thermal image development apparatus and particularly to a reader-printer apparatus such as a microfiche reader-printer apparatus having an in-place thermal development means for formation of a hard copy of the displayed material.

There has been an enormous increase in the volume of records, reports and other documentary information in industrial, educational and other institutions. This has resulted in a significant increase in demand for a documentary storage means which can store a large volume of printed matter in a small and compact storage medium but which can also be made readily available for subsequent recovery and viewing, and if necessary, making a hard copy. Microfilm data processing systems have been developed with such capabilities. Generally, a greatly reduced photographic copy is made of the original printed data to form a microimage, and thereby storing large quantities of data in a small portion of a film. Projecting and enlarging apparatus is then available for viewing the microimages on the film, with various search means provided for rapid location and visual recovery of the stored material from the film. The viewing apparatus preferably includes a reproducing means to permit hard copying of the displayed information upon demand. A particularly satisfactory film storage system uses small film cards identified as "microfiche" film sheets or cards. A microfiche is thus a single sheet of film which may be approximately 3"×5" in size. Generally, each microfiche is able to store the equivalent of several hundred pages of a normal size book, periodical or report. The microimages on the film are obviously such that the data cannot be read without the aide of an enlarging and projection apparatus. Projection apparatus is available to receive a microfiche with means for aligning and displaying a given portion thereof onto a viewing screen to present the subject matter for convenient viewing. The apparatus as noted above preferably includes a print out system for copying of the projected image. Various electrostatic processing devices which form an integrated part of a reader-printer have been suggested. For example, U.S. Pat. No. 3,877,805 discloses a viewer-copier apparatus with an electrostatic copying and liquid developing system. The apparatus has a cabinet with a front wall viewing screen. A microfiche carrier is adapted to slide into a viewing slot in the lower portion of the cabinet. An image projecting system is provided for projecting of an aligned portion of the microfiche, with a suitable mirror system for redirecting of the light along the necessary path to enlarge the image and present the same in convenient reading display on the viewing screen. The printer unit has a copy sheet transport structure to move paper sheets from a storage portion in the back of the housing to a top exposure portion, located to the back side of the mirror. When an exposure is to be made, a directional mirror is removed such that the image is transmitted directly with the paper sheet which has been moved into appropriate alignment the transmitted. The exposed sheet is then moved through a liquid developer applicator with roller means for removing excess fluid and the final discharge of a liquid developed hard copy. The liquid system is suggested to eliminate certain problems associated with move conventional electrostatic copying systems. Other electrostatic systems of course have been suggested. For example, U.S. Pat. No. 3,922,083 discloses a microfiche viewer-reader in which a paper roll is provided and proper lengths are removed and transferred onto an exposure support, and the exposed paper then passed through an electrostatic developer.

Other developers have also been suggested. For example, U.S. Pat. Nos. 3,899,248 and 4,054,379 disclose corona charging and light exposing with suitable liquid toners and developing medium while U.S. Pat. No. 4,054,379 discloses the use of a liquid developer.

In addition to such developer systems, electrostatic and other generalized copying systems have been developed. For example, a thermal developer particularly useful in association with "dry silver" coated paper has been developed by Minnesota Mining and Manufacturing of Minnesota which is capable of creating an excellant hard copy. Generally, U.S. Pat. No. 3,629,549 discloses a thermal developer for such coated paper. U.S. Pat. Nos. 3,575,580 and 3,311,040 show other similar thermal developers. In such systems, the paper is passed between a roller and a curved heated backing wall to heat the paper to the level necessary to develop the image.

However, thermal development with known technology appears relatively slow, and the available systems have been relatively large and expensive. Such a system has not been widely adapted to a microfiche printer-reader in the retail market.

SUMMARY OF THE PRESENT INVENTION

The present invention is particularly directed to a compact thermal developer establishing an effective and uniform heating of a film or paper such as "dry silver" type copy paper and other thermally developed copy paper. The thermal developer of this invention may be a small compact unit and is particularly adapted to incorporation into a novel microfiche reader-printer apparatus, and is described herein in connection therewith.

Generally, in accordance with the unique aspect of the present invention, the developer includes multiple roller heater units such as a two-stage unit for straight pass-through movement of the paper with optimum development of an image. Similar combination roller-heater developer units are preferably constructed and arranged to pass the exposed paper or sheet through succeeding stages in a reverse direction such as to present opposite faces of the paper to a heating unit. This over-and-under movement provides for effective straightening of the sheet while simultaneously effectively and fully developing the image. The roller-heater developer units are specially constructed to maximize the conduction of heat from the heating unit to the paper with the roller especially constructed to develop a uniform hot background and thereby providing uniform heating of the copy paper member. Thus, in accordance with another feature, a unique roller developing unit is provided to produce effective uniform heating of a copy paper member. Each roller unit includes a thin transport and background roller supported within a recess or groove in a heating unit to define a developing gap through which the copy paper is transported.

In a practical reader-printer application of the invention, a compact roller-heater unit is mounted within a film reader-printer with a means for delivering copy paper into alignment with an image plane adapted to receive an image transmitted from a microfiche or other film carrier. The exposed paper is then fed through the thermal developer for development of the image placed on the paper and creation of a hard copy of such data.

In a particularly practical embodiment of the present invention, the roller-heater unit includes a paper transport roller means having an inner thin metal tube and an outer thin face especially constructed to provide a high friction force on the paper. The transport roller means is located within an arcuate recess portion of heat source bar which is heated to a regulated temperature. Rotation of the roller means causes the paper to be fed through and over the curved heat source bar for development of the heat sensitive coating. The system may advantageously include means urging the heater bar and roller into engagement to provide a controlled grasping of the paper and to provide a more rapid heating of the paper. Alternatively, the roller may be mounted so as to define a close and controlled gap slightly greater than the thickness of the copypaper and through which the exposed paper passes. In this structure, the ends of the roller may, if desired, be specially formed to create the appropriate spacing or gap. A second similar developer stage is mounted immediately adjacent the exit end of the first developer stage. The second or exit stage is similarly constructed with a nested roller and heat source bar construction, but with the location reversed relative to the opposite sides of the paper. This in effect provides an under-and-over motion of the paper as it moves in a single direction through the two stages for effectively heating thereof for development and also eliminating permanent curling of the paper such as might otherwise develop.

In order to provide optimum development, the inventors discovered a unique structure of the transport roller which minimizes heat loss and maximize heat transfer to the paper with a uniform heating of the paper. Generally, in this aspect of the invention, the roller includes a central support shaft. A thin metal tube is supported on the shaft by heat insulating end members. The tube is a high thermal conductivity material such as aluminum to establish rapid and even thermal distribution of the energy while maintaining the structural support. The end members are mounted to the shaft with a floating connection to firmly support the tube for rotation with the shaft while permitting slight relative movement to compensate for differences in the coefficients of thermal expansion of the respective parts. The thin metal tube is covered with a frictional material such as a silicone rubber coating to establish sufficient friction for positive paper movement without adversely effecting the thermal transmission. Although the coating may produce heat insulation, the coating is relatively thin and will transfer the heat to the thermally light inner tube as required such that the temperature differential between the heating bar and the transfer roller means is minimal. The roller means is thus thermally light and rapidly and uniformily heated to the desired operating temperature. The roller-heater units are also preferably mounted in heat insulating end supports, such as plastic walls or brackets which create a further broken heat path from the units and contribute to the uniform heating of the paper necessary to produce a high quality hard copy.

The unit also rapidly heats to the operating condition. When employed in a microfiche reader or the like, it is of course significant that the assembly have the ability to reach the necessary developing temperature within a short initial warmup period.

In a preferred microfiche reader-printer embodiment, the microfiche reader apparatus includes a double-faced mirror unit mounted within a cabinet to receive optically generated images. In a normal viewing position, the mirror unit has a front mirror located to receive the microfiche image from a small transfer mirror, and to transmit the image onto a front viewing screen. An exposure frame structure for the copy paper is located to the back side of the mirror unit. When it is desired to expose the image onto a copy paper placed in the copy frame, the mirror unit is pivoted to an opposite angular orientation and the small transfer mirror is pivoted from the image path. The image is then transmitted directly to the back mirror of the mirror unit and redirected therefrom onto the paper on the exposure frame. The exposed paper is then transported through the thermal developer. A source of copy paper is provided in suitable form with powered transfer means for moving the paper through the exposure frame and the developer. The paper may be provided in roll form and passed through a paper cutter means. The paper cutter may be of any suitable design and may advantageously include a fixed cutting bar located to one side of the path of the paper immediately below the image exposure plane. A movable cutter bar or blade is mounted to progressively move across the stationary cutter bar to affect a scissor cutting action on the paper and thereby produce a rapid smooth severing of the paper from the roll. A paper transport means may include a multiple belt unit in the exposure plane which carries and supports the paper for exposure and an automatic position sensing means to move and cut the paper from the storage roll.

Positive transfer rollers are preferably located to the exit end of the exposure frame and the entrance side of the thermal developer. The transfer feed rollers grasps the exposed paper after exposure and delivers the paper into the thermal developer. This contributes to the rapid and uniform heating of the paper as it passes through the developer.

The present invention particularly provides a compact unit which maintains the heating characteristic of other larger devices, and which will produce high quality hard copy reproductions. The paper enters in one end and exits from the opposite end with a straight pass-through path in contrast to a reverse return path, generally used in thermal roller developers. The developer may be made in a reliable and rugged construction and can be manufactured without undue complication and expense. The present invention has been particularly found to provide an effective, compact thermal developer which is particulary adapted to incorporation into a microfiche or similar film viewer-printer. The resulting device provides a relatively esthetically pleasing unit because of its compact construction.

DESCRIPTION OF THE DRAWING FIGURES

The drawings furnished herewith illustrates a preferred construction of the present invention in which the above advantages and features are clearly disclosed as well as others which will be readilly understood from the following description.

In the drawings.

DESCRIPTION OF THE ILLUSTRATED EMBODIMENT

Figures 1, 2:
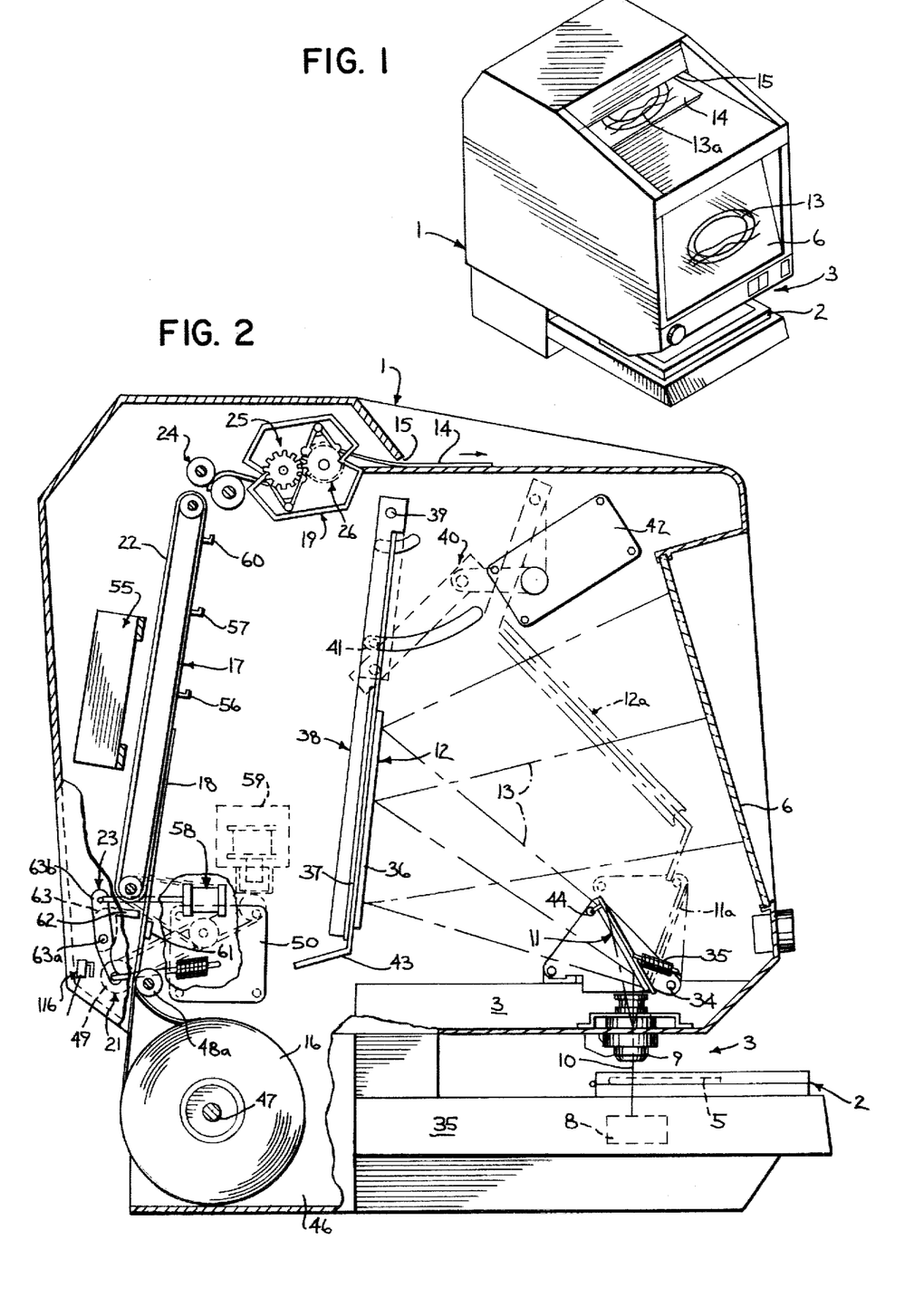
FIG. 1 is a pictorial view of the microfiche reader-printer adapted for incorporation of the present invention.
FIG. 2 is an enlarged side elevational view, with parts broken away and sectioned to show details of construction.
Figure 3:
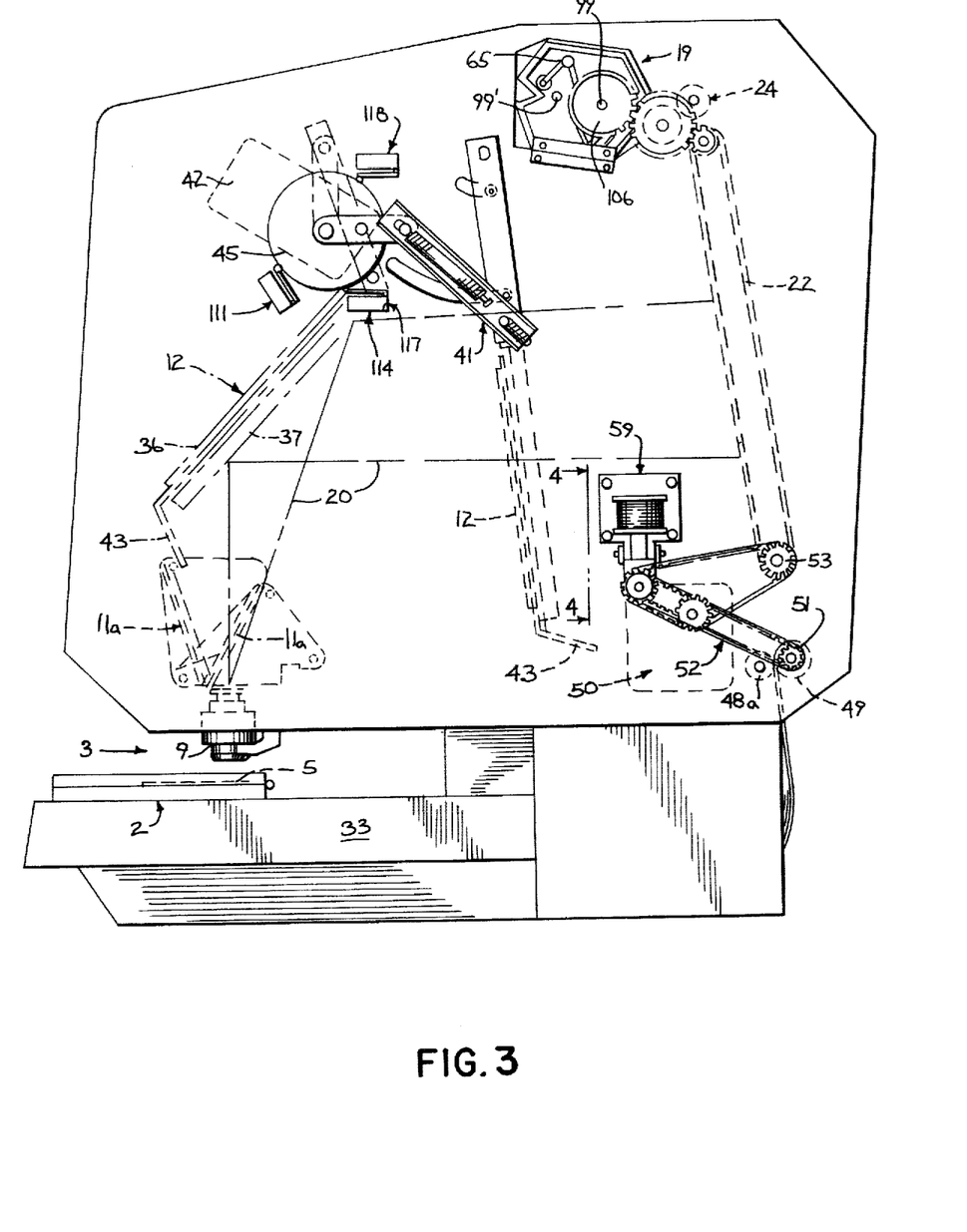
FIG. 3 is a side view of the apparatus from the side opposite FIG. 2.

Referring to the drawings and particularly to FIGS. 1 and 2, a microfiche reader-printer is shown including an outer housing 1 adapted to be placed upon a table or other supporting structure, not shown. A microfiche holder or carrrier 2 is slideably mounted in a projection opening or slot 3 in the lower front of housing 1. The carrier 2 includes an upper pivoted wall 4 to permit opening and location of a microfiche 5 therein. When placed within the projection slot 3, a portion of the microfiche 5 is displayed on front viewing screen 6 which is shown as the front housing will located immediately above the projection slot 3 for the viewing of the information or data. In accordance with conventional practice, an optic system 7 includes a lamp 8 and projection lens 9 for projecting the image on a small aligned segment of the microfiche 5 into the housing 1 as at 10. A pair of mirror unit 11 and 12, mounted within the housing, transmit and enlarge the image onto the viewing screen 6 as shown by the phantom projection image lines 13, which are visually displayed as shown in FIG. 1. A copy or printout system is also built into housing 1 and is adapted to discharge a printed copy sheet 14 from a top wall discharge opening 15 in the illustrated embodiment. Generally, the copy system is located to the back side of the housing 1 and includes a source of copy paper shown as a roll 16, an exposure frame structure 17 adapted to receive and present a flat sheet 18 of the paper from roll 16 and a thermal developer structure 19 for developing of the exposed copy sheet 18. In the full line mirror position shown, the image is transmitted to the front viewing screen 6 as shown by image lines 13 in FIG. 2 to be viewed by the user. The mirror units 11 and 12 are adapted to be rearranged within the housing 1 to an alternate position, shown in dashed line illustration as at 11a l and 12a in FIGS. 2 and 3. In the alternate position, the image is transmitted to the back side of the outer housing to the copy frame structure, as shown in FIG. 3 by image transmitting lines 20. Copy paper 18 is stored in the storage roll 16 and is power driven into the copy frame structure 17 by a suitable drive means which includes driven roller means 21 and driven belts 22 in structure 17, such as more fully discussed hereinafter. A cutter mechanism 23 is located between the paper storage roll 16 and the lower end of the copy frame structure 17 for severing of the paper sheet 18 from the roll 16 and permitting transfer into the thermal developer 19. After exposure, the exposed paper 18 is automatically transferred to the thermal developer 19, the embodiment of which particularly forms a significant aspect and teaching by the present inventors. A pair of driven transfer rolls 24 are shown mounted to the upper end of the frame structure and are adapted to positively transport the exposed paper sheet 18 from the exposure plane into the thermal developer 19.

Generally, the illustrated novel embodiment of the paper developer 19 includes similar first and second thermal stages 25 and 26 with the paper sheet 18 passing in a sinusoidal path in an under-and-over manner but in one direction through the two stages, such that the final exiting paper copy 14 is a relatively flat hard copy sheet 14.

Figures 4, 5:
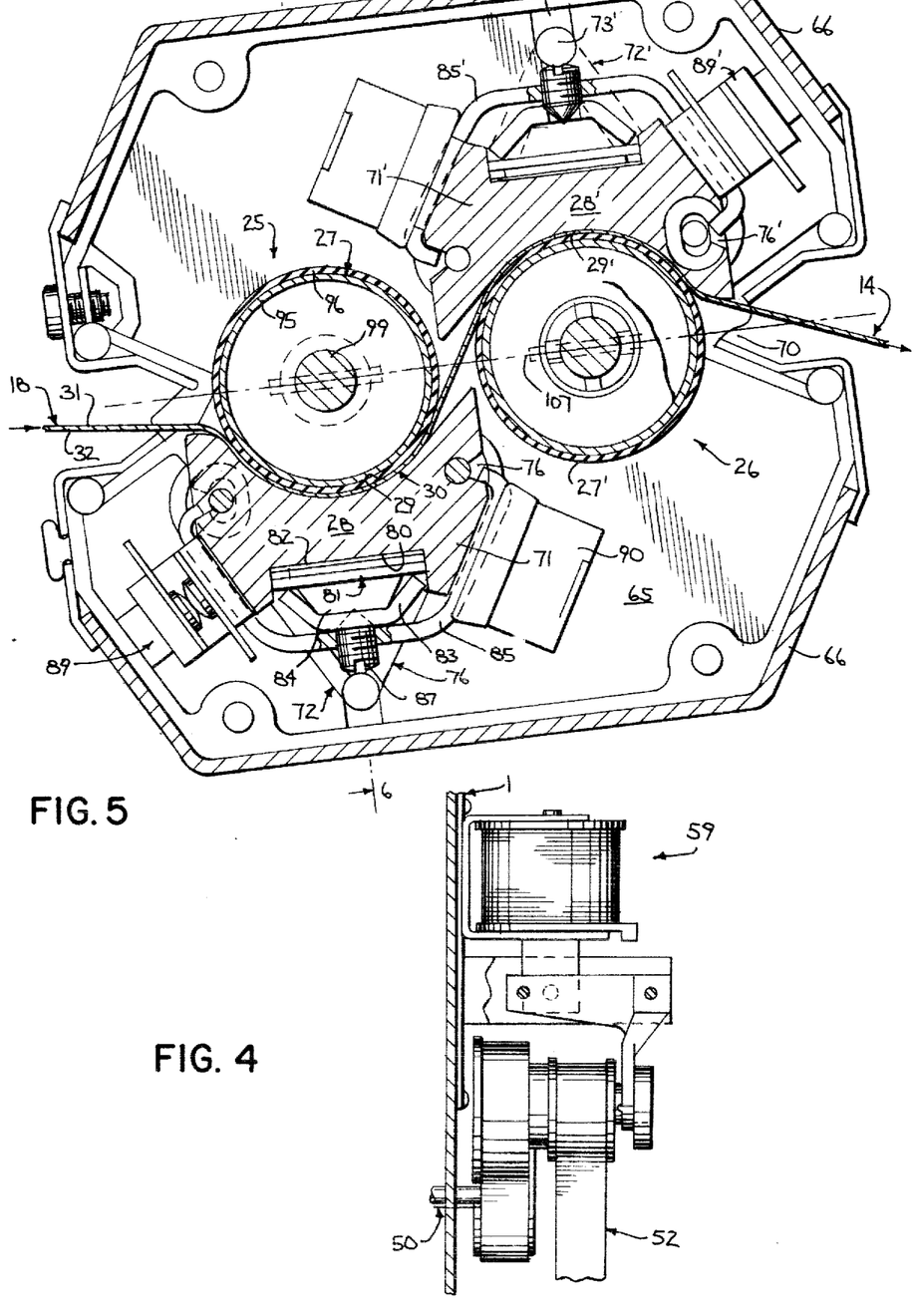
FIG. 4 is a fragmentary view of a clutch portion of the paper feed drive.
FIGS. 5 and 5a are enlarged vertical sections through the thermal developer illustrated in FIGS. 2 and 3.
Figure 5A:
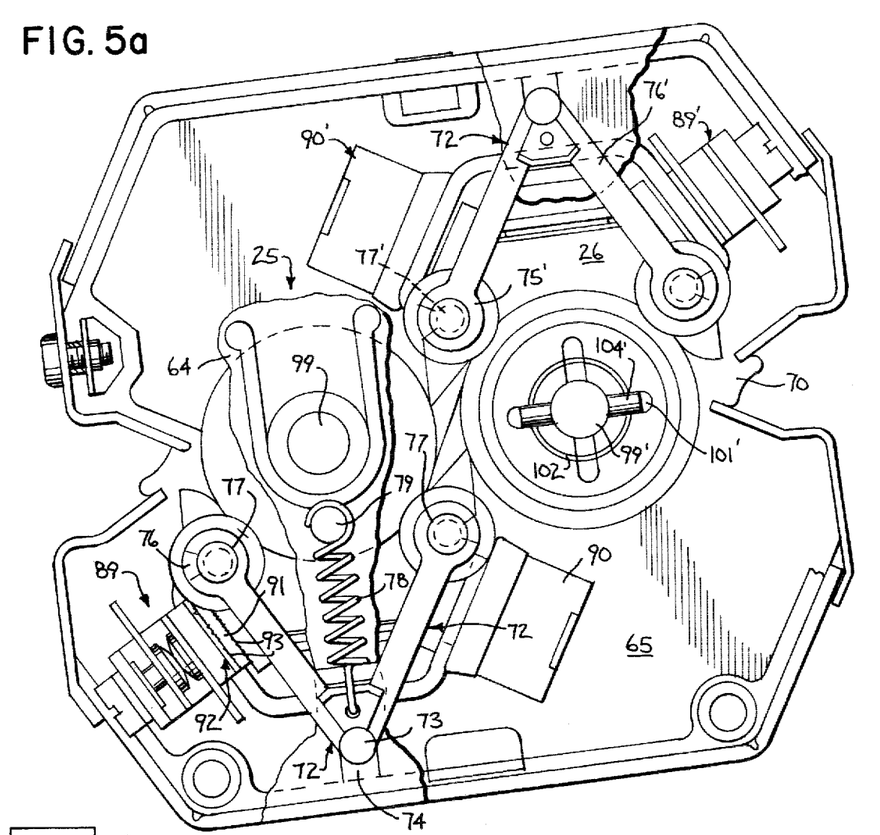

Each stage 25 and 26 is shown of the same basic construction, and is most clearly shown in FIGS. 4–7. Referring particularly to the first stage as shown in FIG. 5, a power driven roller structure 27 is located in opposed and nested relation within a heating bar structure 28 having a circumferential groove or recess heating surface 29 mating with the roller. The roller structure 27 in this embodiment is mounted in a normal engagement with the heating surface 29 of the bar structure 28. The bar structure 28, as more fully developed hereinafter, is movably mounted and is moved by the copy sheet to define a corresponding gap 30 through which the exposed copy paper 18 enters and moves. The power driven roller structure 27 grasps the paper 18 and pulls the paper through the gap 30 and thus across the hot surface 29 of heating bar structure 28. The heating bar structure 28 and the roller structure 27 are especially constructed to establish a uniform and necessary heating of the copy paper 18 to develop the exposed image and produce a hard printed copy of the information appearing on the screen 6 and thus on the aligned portion of microfiche 5.

The second stage 26 is similarly constructed with the roller structure 27' and the heating bar structure 28' disposed to the opposite sides of the paper movement with respect to the first stage 25. The opposite surfaces of the paper thus engages the heating surfaces 29 and 29' in moving through the developer. The paper 18 is generally a coated paper having a support base sheet 31 with the coating 32 applied to one surface. In the illustrated embodiment the stages 25 and 26 are arranged such that the special coating on the copy paper 18 is passed over the heating surface 29 in the first stage 25 and over the roller structure 27' in the second stage 26. The exposed coating softens on being heated and distortion may occur if the softened surface is drawn across the fixed heating surface 29' of the second stage 26.

In operation, the user can, through a suitable indexing means, automatically align any portion of the microfiche 5 with the optic system for projection of the image to the screen 6 or alternately to paper sheet 18 in the exposure frame structure 17. In this manner the material stored on the microfiche 5 can be selectively reviewed, and whenever desired, a hard copy 14 made.

More particularly, in the illustrated embodiment of the invention, the reader-printer housing 1 is generally rectangularly shaped with a base portion 33 within which the lamp assembly 8 is mounted. The top wall of the base portion defines the bottom wall of the carrier slot 3 which is constructed with a suitable known fiche alignment means, not shown, to permit predetermined alignment of the carrier and fiche 5 with the lamp 8. Projection lens 9 which is also of any suitable construction, is mounted in the upper wall of the housing slot for transmitting the image into the housing 1. The mirror assembly includes the first relatively small mirror unit 11 having a pivoted mounting bracket 34 secured to the backside of the mirror and pivotally attached within the housing 1 by a suitable pivot pin. A side wall locating bracket is secured to the mirror 11 and is adapted to rest on the bottom wall of the housing to support the mirror in predetermined angular orientation over the projection lens 9.

An extension type spring 35 continuously urges the bracket and mirror into the full line angled position. In this position, the image 13 is projected to the viewing screen 6 as previously discussed. Thus, mirror 12 includes a front mirror 36 operable to transmit the image 13 as shown in FIG. 2. Mirror 12 also includes a back mirror 37 which is operable to transmit the image 20 to the exposure plane structure, as follows.

The large mirror unit 12 includes a common support bracket 38 which is pivotally mounted within the upper portion of the housing 1 as at 39 between a pair of structural supporting sidewalls 39a within housing 1. In the illustrated embodiment of the invention, a linkage unit 40 is mounted to the outside of the sidewall and pinned by a pin 41 to the pivot bracket 38 through a slot in the sidewall and to a timing motor 42 attached to the opposite side of the sidewall. The motor 42 is selectively operated to rotate and reposition the mirror 12 from the full line position to the alternate phantom line position in FIG. 2. An arm 43 is provided on the lower end of the support 36 and engages a roller unit 44 on the upper end of the small mirror unit 11. As mirror unit 12 pivots to the exposure position, the final movement thereof positively pivots the small mirror unit 11 from the path of the optic lens 9. The arm thus depends to a more and more vertical position as the mirror unit 12 pivots, with the lower end, moving into engagement with the positioning roller 44 on the upper end of the small mirror. The small mirror is thereby simultaneously moved to the alternate, phantom line position.

Figure 8:
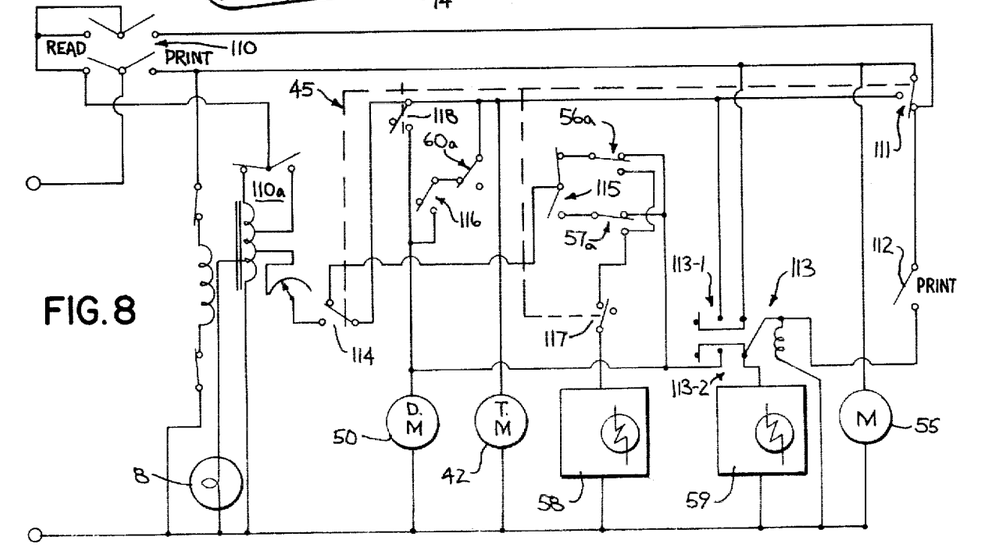
FIG. 8 is a schematic control circuit suitable for operating the reader-printer.

The motor 42 also drives a cam unit 45 for operating a plurality of cam switches such as diagrammatically shown in FIG. 8 for moving of the paper during and after the repositioning of mirrors.

In this alternate position, the image from the projection lens 9 projects upwardly as an enlarged image into engagement with the back mirror 37 of the mirror unit 12. The mirror 37 redirects the image 20 rearwardly onto the print frame or support structure 17 and onto the copy paper 18 which is located on such support. Exposure of such paper 18 creates the corresponding image thereon.

The copy paper 18 is stored in the storage roll 16 located in a rear bottom paper compartment 46. Such paper 18 is readily available in roll form and suitably supported at the opposite ends in suitable rotatable bearing members 47 for free rotation of the paper roll and pulling off of a length thereof into the cutter unit 23 and onto the exposure frame 17. The cutter drive means includes the pair of cutter feed rolls 48 and 49, one of which is selectively driven by a motor 50 shown in FIG. 2 as secured to the inside surface of the one sidewall.

The cutter feed rolls include an elongated fixed roll 48 and opposed power driven rolls 49 which are secured to a common shaft 51 which is coupled to the drive motor 50 by a belt and pulley drive coupling assembly 52. Rolls 48 and 49 pull the free end of the paper 18 from the storage roll 16 and move it upwardly past the cutter unit 23 and into the exposure plane structure 17 and onto belts 22. The endless belts 22 of the exposure frame structure 17 are spaced from each other and rotatably mounted at the top and bottom of the housing by suitable supporting rollers. The lower roller includes a drive gear 53 also coupled by the pulley drive coupling assembly 52 to the motor 50. Thus, energizing of motor 50 moves the paper 18 into paper frame structure 17.

A small fan unit 55 is mounted to the backside of the drive belts 22 and develops a suction force on the backside of the copy paper 18 to hold the paper in firm abutting but sliding engagement with the belts 22. This more or less conventional belt transfer mechanism is similar to that used in various copying devices and no further description thereof is given.

As copysheet 18 moves upwardly across the exposure frame, the upper edge engages suitable switch lever means connected to control the deenergization of drive motor 50 and the clutch assembly for sequential operating the cutter bar unit 23. In the illustrated embodiment of the invention, an 8" cut switch lever 56 and an 11" cut switch lever 57 are illustrated which control suitable switches shown and correspondingly identified as switches 56a and 57a in FIG. 8. If the final sheet is to have a length of 8", switch 56a is set to control the motor circuit. If the larger 11" length paper is desired, the second switch 57a is coupled into the motor control circuit to actuate the cutter unit 23.

The cutter unit 23 is separately actuated by a cutter solenoid 58 mounted to the housing structure and operable to sever the paper 18 from roll 16, as hereinafter described.

A solenoid-operated clutch assembly 59 couples the drive motor 50 to the feed rolls 49 and to the belts 22 for selective operation thereof. The clutch assembly 59 is deactuated to permit driving of belts 22 without operating feed rolls 48 and 49. The severed paper 18 is fed upwardly on the exposure structure by belts 22 until a paper stop switch 60 lever is actuated by the upper edge of the paper 18.

Thus, in operation, clutch assembly 59 is actuated with energization of motor 42 and the paper 18 is withdrawn from roll 16 by operation of feedrolls 48 and 49 and belts 22 until switch lever 56 or 57 is operated. The cutter solenoid 58 is then actuated to sever sheet 18 from roll 16. Motor 50 is then operated with the clutch assembly 59 deactuated to only drive belts 22 and move the severed paper sheet 18 into the exposure position as detected by operation of switch lever 60.

More particularly, the cutter unit 23 includes stationary cutter blade 61 shown as a metal bar having a flat face located essentially in the plane of the paper 18, and with the upper edge defining one cutting edge. A movable cutter blade 62, in the form of a metal bar, is mounted for movement perpendicular to the paper plane and across the uppermost edge of the fixed blade 61, in close cutting relation thereto. The movable blade 62 is preferably formed with a slight angled cutting face or edge to create a scissor-like severing of the paper 18 between the cutting blades. In the illustrated embodiment of the invention, the movable cutter blade 62 is moved by a pair of push members 63 pivotally mounted on a shaft 63a to the rear side of the cutter blade 60. The shaft is coupled to a cutter solenoid 58 by a lever 63b for selective pivotal movement of the push members 63 and cutter blade 62 over blade 61. This permits removal of the upper portion of the paper sheet 18 and subsequent movement into the exposure position.

The paper 18 is then momentarily held in position and exposed to the microfiche image 20 for a preselected period. The lamp and image projection system is then turned off and the exposed copy sheet 18 is moved by operation of belts 22 upwardly into the transfer rollers 24 and then to the thermal developer 19. In the illustrated embodiment of the invention, the transfer rollers 24 are mounted immediately adjacent to the upper discharge end of the belts 20 and may include one lower solid roller and a pair of laterally spaced rollers. Thus, the paper 18 as it moves from the belts 22, tends to move outwardly from the belts as a result of angulated orientation. The edge of the sheet moves into engagement with the lower feed roller of rollers 24 and then moves upwardly between the feed rollers 24. The leading edge of the sheet 18 is then propelled into the thermal developer 19 where it passes in one direction between and through the first and second developing stages 25 and 26 to develop and set the exposed image to form the hard copy sheet 14. The paper sheet 14 is discharged as a relatively flat paper sheet as previously discussed.

The paper employed is preferably a "dry-silver" coated paper 18 such as manufactured and sold by Minnesota Mining and Manufacturing Company. Such paper has a relatively minute coating 32 on one side of the paper sheet 31. The coating 32 chemically reacts in the exposed areas in the presence of an appropriate heat level. The chemical reaction is manifested by a change in the exposed coating from a clear to an opaque gray or black color. The reaction is activated by subjecting the paper to a rapid and appropriate temperature increase. The energy transfer should be regulated so that essentially the same amount or level of thermal energy is presented to and absorbed over all sections of the paper. The development time is determined by the temperature increase to which the paper is subjected. The opposite sides or surface of the paper 18 are generally subjected to substantially similar temperature to promote uniform heating of the coating and for a sufficient period to allow the paper 18 to properly absorb the thermal energy. The speed at which the copy sheet is moved through the developer stages also effects the thermal energy absorbed by the copy sheet. If an excessive exposure is created, an optimum hard copy may not be obtained. The exposure will of course be affected by the particularly copy paper used, the temperature of the heating source or the like, and can be determined by simple testing.

The thermal developer 19 is shown in a preferred construction to illustrate the present invention.

Figure 6:
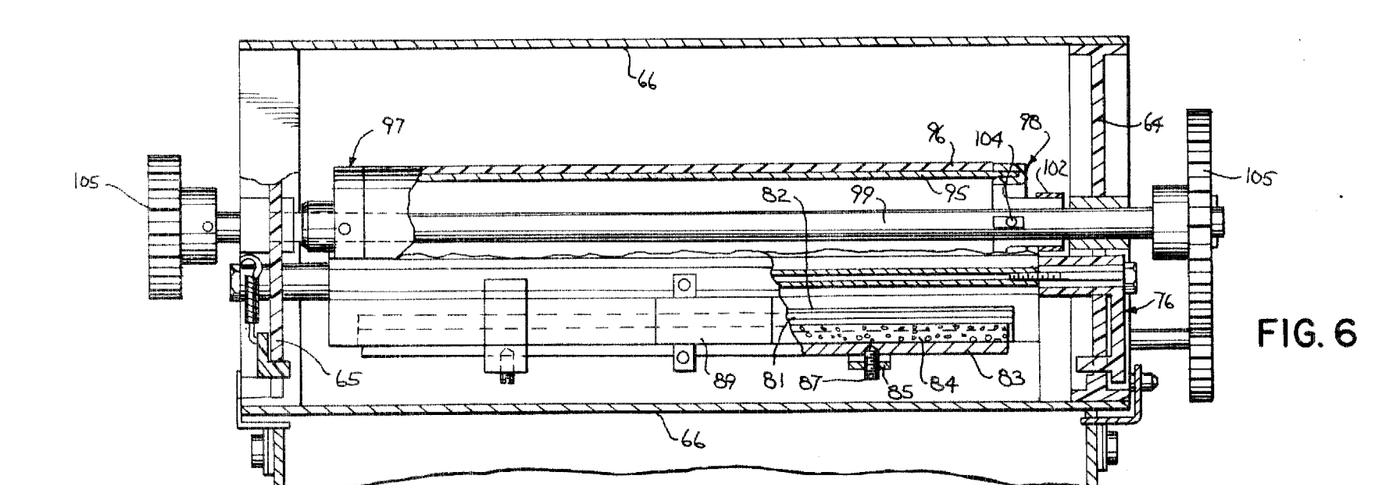
FIG. 6 is a partial sectional view taken generally on line of 6—6 of FIG. 5, with parts broken away and sectioned to show certain detail of construction.
Figure 7:
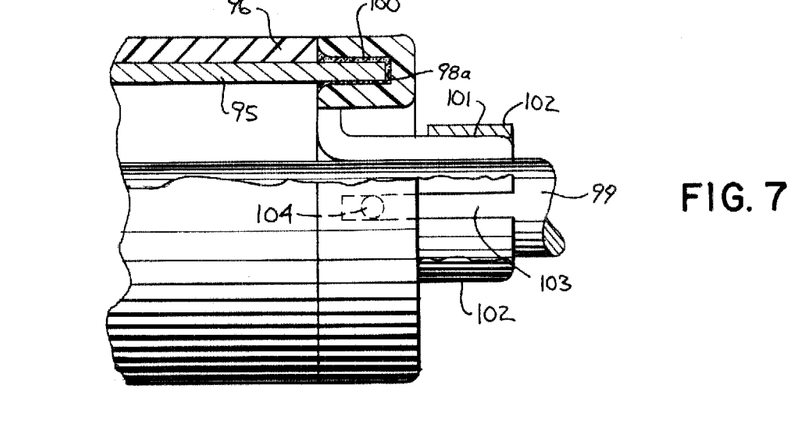
FIG. 7 is an enlarged fragmentary view of a pinned roller connection shown in FIG. 6.

Referring particularly to FIGS. 5-7, a preferred developer structure is shown. The illustrated embodiment of the novel thermal developer 19 includes opposite end support caps 64 and 65 within which the first and second developing stages 25 and 26 are mounted. The illustrated end caps are one-piece molded plastic parts which include integrated bearing and supports for the several elements of the roller structures of the heating bar structures of the developer 19. The special end caps thus eliminate the multiple component parts found in other rotary thermal developers. Outer enclosure walls 66 are secured to the caps 64 and 65 by small clips 67 at the opposite ends to effectively enclose the developing stages with the exception of paper entrance and exit openings. The end caps 64 and 65 are suitably secured by mounting bolts 68 to the supporting sidewalls of the housing to locate the thermal developer 19 with the entrance opening 69 aligned with the transfer feed rollers 24. The exit opening 70 is aligned with the discharge opening 15 in the top wall of the housing 1.

Referring particularly to the first thermal developing stage 25, the heating bar unit 28 includes a relatively heavy aluminum bar 71 which extends completely between the end caps 64 and 65 and is somewhat longer than the width of the hard copy paper 18. The bar 71 is mounted in position between the end caps and to one side of the entrance opening and securely held in place by a pair of opposite end brackets 72 located within the end caps. The end brackets 72 are similarly formed as V-shaped members as shown in FIGS. 6 and 7. The apex of the V-shaped member is secured to a shaft 73 which extends through slots 74 in the end caps 64 and 65 to permit limited movement of the members in relation to the roller structure 27. The ends of the brackets 72 are spaced in accordance with the width of the bar 71 and include integral locating hubs 75 which project through the end caps into abutting and locating engagement with the adjacent ends of the bar 71. The bar 71 is provided with small C-shaped bolt openings 76 to the opposite sides of the heating bar and the roller recess. Bolts 77 extend through the opening hubs 75' to clamp the heating bar 71 to the brackets 72 which movably support the bar 71 relative to the roller structure 27. In the illustrated embodiment, the bar 71 in stage 1 is located below roller structure 27 and is gravity biased therefrom. An extension spring 78 or other suitable means urges the bar into engagement with the roller structure 27. Spring 78 is shown acting between the apex of the bracket 72 and a pin 79 on the end cap. In stage 26, the bar 71' is gravity biased to engage the roller structure 27' and the extension spring may be eliminated. The mounting thus maintains essentially complete thermal isolation of the heating bar structure 28 and minimizes heat loss because of thermal conduction from the bar.

The aluminum bar 71 is formed with an outer recess 80 to receive a suitable heating element 81 such as a flat, wire-wound heating unit. The illustrated heating element is thus a known strip type element having a suitable high resistance wire wound around a rigid supporting strip of high temperature insulating material, such as Mica. The heating element 81 is clamped within the recess abutting a thin insulator 82. A curved clamping strip 83 of steel or the like is located with sides edges abutting the back or outer side of the heating element 81 with a suitable thermal insulation 84 located within the strip to the backside of the elements 81. Two "C" shaped brackets 85 are spaced longitudinally along bar 71 and extend over the strip 83 and sides of bar 71 with the ends meshing with slots 86 in the sides of bar 71.

Pressure screws 87 thread through the base of brackets 85 and bear on the clamp strips 83 to hold the heating element 81 in firm abutting engagement with the insulation and base of the heating recess. The insulated mounting minimizes heat flow from element 81 toward the backside of the heating unit. The heating element 81 provides a high energy source for rapidly heating of the relatively heavy aluminum bar.

Figure 6A:
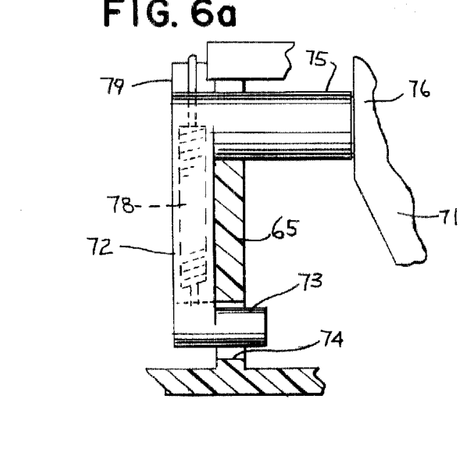
FIG. 6a is an enlarged fragmentary view of a heater mount bracket shown in FIGS. 5–6.

Thermostatic control units 89 and 90 are shown secured one each on the opposite back side edges of the aluminum bar 71. The edges are shown removed to define flat sensing surfaces. Temperature regulating thermostat unit 89 is secured to the one flat surface, shown to the left side of the aluminum bar in FIG. 5. This thermostat is set to regulate the temperature of the bar to a level of approximately 300° F. To protect the unit against abnormal heating conditions, fail-safe thermostatic unit 90 is coupled to the opposite flat side of the aluminum bar. Although any suitable control can be used, the regulating thermostat 89 is preferably a specially constructed bimetal unit to ensure continuous monitoring control. As shown most clearly in FIG. a small heat transfer plate 91 is secured to face of the heating bar 71. The bimetal leaf member 92 is mounted abutting the plate 91. A thermally conductive grease-like medium 93, such as silicone, is applied to the opposite faces of the plate 91. The grease-like medium 93 maintains a thermally operative bridge when the bimetal leaf deflects.

The face of the aluminum bar opposite the heating unit has the curved recess 29. The recess has a radial sector complementing the diameter of the opposed and nesting paper drive roller 27, such that the opposite sides of the paper in moving therebetween engages corresponding surfaces. The positioning of the roller end and opposed recess should create a continuous smooth surface with relatively full engagement between the paper and the heated aluminum bar to establish an optimum heat flow into the copy sheet or paper. The floating mounting of the heating bar create a slight positive loading of the paper between the bar and roller may be provided. Thus, although there need not be significant frictional engagement or a forced contact of the exposed sheet against the heat bar recess surface, the slight pressure is preferred in order to produce and maintain rapid and uniform transfer of heat to the paper. In fact, the roller and heater may, if desired, or necessary for any reason, such as the characteristic of the copy paper or the like, be mounted with a fixed gap therebetween. If a gap is provided between the roller 27 and bar recess 29, the gap should be as small as practical while permitting the paper movement therebetween. With the loaded system, a spacer may be provided to establish a fixed gap between the roller and the bar recess. For example, the axial opposite ends of the roller unit 25 may be provided with suitable spacers to establish a selected gap.

The roller 27 is also specially mounted to the end caps 64-65 and accurately spaced with respect to the heating bar 28. The roller 27 is slightly shorter than the width of the heating bar 28 but longer than the width of the paper 18 to produce engagement over the complete width of the paper. The roller 27 is constructed with an inner tube 95 of aluminum or other suitable material having an outer friction coating 96. Tube 95 is supported by end caps 97 and 98 of heat insulating material on a driven shaft 99. The tube 95 is preferably formed with a minimum thickness to provide the necessary structural support while forming a thermally light structure to provide quick and uniform distribution of the heat over the interface and particularly over the back side of the copy sheet 18. The outer surface of the aluminum tube is covered or coated with a thin coating of a high quality friction material 96 which is selected to create a firm frictional grasp of the exposed copy sheet 18 for appropriate timed transfer thereof through the developer. The coating 96 is relatively thin so as not to interfere with the rapid heat transfer to the distributing aluminum tube 95. For example, a thin silicone coating 96 on the order of 0.06 inches thick on an aluminum tube 95 on the order of 0.04 inches thick may be used. Such a coating 96 has been found to provide a highly effective transfer of the exposed paper 18 while maintaining of the desired temperature conditioning, but any other suitable coating material may of course be used.

The inner aluminum tube 95 projects axially at the opposite ends beyond the friction coating 96 and into the similarly formed end caps 97 and 98. The cap 98 shown to the right in FIG. 6 is described in detail with corresponding parts of cap 97 identified by corresponding primed numbers.

Referring to the right end in FIG. 6, the end cap 98 is shown in section. The cap 98 is a molded plastic member having a generally U-shaped groove 99 aligned with the end of the aluminum tube 95. The aluminum tube 95 projects into the groove 98a and is preferably firmly affixed thereto by a suitable adhesive 100 such as an epoxy or any other material which will withstand the various thermal and other stresses created during the operation of the developer. The central portion of the end cap 98 includes a cylindrical bearing hub 101. The steel shaft 99 extends completely through the roller assembly 27 and the end cap bearing hubs 101 to rotatably support the roller. The hub 101 includes a plurality of longitudinally extending slots or slits 103 which are located as diametrically opposite pairs. A coupling pin 104 extends through the shaft and the paired aligned slots 103 of the hub to rotationally couple the tube 95 and therefore the roller unit 27 to the shaft. The hub 101 extends outwardly from the coupling pin and an outer clamping band 102 is secured to outer end of the hub. The end cap 98 is thereby rotationally affixed to the shaft 99 while permitting slight relative axial movement between the shaft and the hub.

The shaft 99 is formed of a steel or other strong metal to formly and rigidly support the roller unit 27 in fixed relationship to the heating bar unit 28. The shaft therefore generally will have a significantly different coefficient of thermal expansion when compared to the plastic end cap and the aluminum tube 95. The illustrated mounting accommodates differential movement created by the different coefficients of expansion while maintaining accurate alignment and support of the roller with respect to the heating bar.

The shaft extends through the mounting brackets which are preferably molded with suitable tubular and support or bearings. The bearings and hubs of the end caps are closely spaced to maintain axial alignment of the roller with the heating bar. The end caps in turn have molded mounting pins for mounting of the assembly to the housing.

The shaft 99 extends outwardly to the one side of the supporting structure with drive gears 105 pinned or otherwise affixed thereto and forming part of a suitable gear drive system connecting the roller shafts 99 and 99', and therefore coupling the roller units. The opposite end of the shaft 99 extends outwardly from the opposite end cap and is connected by a coupling gear 106 to a gear train connected to transfer rollers 24 and to the upper shaft of the drive belts 22 as shown in FIG. 3 for establishing corresponding and simultaneous rotation of the transfer rollers 24 and developer rollers 27 and 27'.

The second stage 26 of the thermal developer 19 is similarly constructed and mounted to the downstream side of the developer 19, with the roller unit 31 and the heater bar unit 32 reversely positioned with respect to the first stage 25 as shown in FIG. 5. Thus, the rollers 27 and 31 are mounted with their axis in a common plane 107 and particularly a substantially horizontal plane. The heater bar 28 of the first stage 25 is located to one side of the common plane while the heater bar 32 of the second stage 26 is located to the opposite side of the common plane. The copy sheet 18 therefore passes between the heater bar and the rollers in the opposite direction with a generally sinusoidal or under-and-over path as previously noted. As previously described, the coated side of the paper softens slightly in passing through the first stage and preferably moves over the roller 27' in the second stage 26.

In operation, the user indexes the desired portion of the microfiche 5 with the optic system for projection of the image. To view the image, the normal full line mirror position shown is used and the image appears on viewing screen 6. To make a copy of such image, the copy control is actuated. The drive motor 50 operates the driven roller means 21 for withdrawing paper from roll 16 and driven belts 22 of structure 17 to move the paper onto the frame structure 17. When the proper length has been withdrawn the switch lever 56 or 57 actuates switch stopping the paper feed, and actuates the cutter solenoid such that cutter mechanism 23 severs the paper sheet 18 from the roll 16. The clutch assembly 59 disengages and the severed sheet is moved into the proper exposure position, and mirror units 11 and 12 are moved to the alternate position, shown in dashed line illustration at 11a and 12a in FIGS. 2 and 3. The image is transmitted to the copy frame structure 17. After exposure the belts 22 transfer the exposed paper 18 to the pick-up rollers 24 which positively transport the exposed paper sheet 18 from the exposure plane into the thermal developer 19.

The developer roller structures 27 and 31 are driven and grasps the paper 18 to move between the roller and heating pan 24 and particularly across the heating surface recess 29. The opposite faces or sides of the copy sheet are subjected to a substantially similar temperature as a result of the distribution of the thermal energy by the aluminum bar and by the thermally light aluminum background tube. As a result, the copy sheet is heated to a uniform temperature to properly develop the exposed image and produce the hard printed copy 14 of the information appearing on the screen 6, and thus on the aligned portion of microfiche 5. The sheet moves through the first stage 25 with the active surface facing the radiating surface of heating bar structure 28 and through the second stage 26 with the uncoated opposite side of the paper against the radiating surface of the second stage 26.

The exposed sheet 18 moves with the under-and-over motion through the two developing stages such that the final exiting paper copy 14 is a relatively flat hard copy sheet 14.

As previously noted, a suitable control circuit is schematically shown in FIG. 8. In the circuit, the several motors, solenoids and exposure lamp, are shown diagrammatically and identified by numbers corresponding to the previous description. A read switch 110 is shown for selectively applying power to the circuit for alternately exposing of the micro fiche 5 on screen 6 and onto the paper 18 aligned with the exposure plane 17. In the read position, the brightness of lamp 8 is selectively and directly connected to power with two different exposures settings by a switched transform circuit 110a.

In the print position, power is supplied to a cam operated switch 111 operated by the cam unit 45 shown in FIG. 3. The switch 111 has a normally closed start position supplying power to a manually operated and normally open print switch 112, which is connected to supply power directly to an interlock relay 113 and to the clutch solenoid 59. When switch 112 is closed, the relay 113 is energized and pulls in a set of power contacts 113-1 which supplies power from the print switch 110 directly to timing motor 42 and to a motor drive and interlock circuit. The latter circuit includes a cam operated switch 114, a paper size selection switch 115 and either one or the other switch of the paper length levers 56 and 57. The lever operated switches 56 and 57 are connected in common to the one side of the drive motor 50, the opposite side of which is connected directly to power. Switches 56 and 57 are also connected to a set of latching contacts 113-2 which supply power to the relay 113 and to the clutch solenoid 59. Thus upon closing of the print switch 112, power is supplied to the drive motor and to the clutch solenoid 59. This starts the drive movement of the motor 50 with the clutch assembly 58 energized to provide the previously described transport of the paper 18 onto the exposure plane 17. When the switch 56 is actuated, the circuit is to the motor 50, the clutch solenoid 59 and the relay 113 is broken. The motor stops, the solenoid deenergizes and the relay resets. Switch 56 is a single pole, double throw switch and simultaneously completes a circuit from the input side of selection switch 115 to the cutter solenoid 58 which moves the cutter unit 23 to sever the paper. The pivoting of the cutter lever 63 also operates a switch 116, shown in FIGS. 3 and 8. Switch 116 is connected in a series circuit with the switch operated by and similarly identical as the positioning lever 60. This series circuit connects motor 50 directly from switch 111 to power without energization of the clutch solenoid 59 as a result of the relay contact being open. This moves the paper sheet 18 upwardly to the exposure position at which time switch 60 opens and deenergizes motor 50. During this period or shortly thereafter cam 45 operates a switch 117 to deenergize the cutter solenoid 58 which resets, which also reopens switch 116. Simultaneously, switch 114 is operated by cam 45 to the alternate position removing power from the cutter solenoid circuit and connecting power to the exposure lamp 8 through the circuit 110a. This provides for a time exposure after which the switch 114 moves to the reset position. Simultaneously or immediately thereafter, a cam operated switch 118 is closed to again directly energize the motor 50, resulting in operation of the belts 22, the transfer rollers 24, and the developer rollers 27 and 31 to transfer the exposed paper 14 through the developing unit 19, with the previously described development of the exposure paper to define the hard copy 14. At the end of the timing cycle the hard copy 14 is discharged through the top housing opening and cam operated switch 111 is reset to the standby position, thereby removing power from the circuit and again requiring recycling through the operation of print switch 112.

The present invention provides a compact developer providing a flat, fully developed hard copy and a developer which is particularly adapted to incorporate into a reader-printer unit including the unique structural features described herein.

Various modes in carrying out the invention are contemplated as being within the scope of the following claims, particularly pointing out and distinctly claiming the subject matter which is regarded as the invention.

We claim:

1. A thermal developer for supplying heat to a copy sheet having a thermally developable surface material for copying of the original material and said copy sheet subject to being set in a curved shaped by the development heat for said surface material, comprising a first and second roller unit, each of said units including a roller unit mounted with the axis of the roller units in a common plane and having an entrance means and exit means to and from said roller units substantially in said common plane, a first heat source having a heat radiating surface substantially matching the curvature of said first roller unit and located to one side of said plane in nesting relationship to the first roller unit, and a second heat source having a heat radiating surface substantially matching the curvature of said second roller units and located in nesting relationship to said second roller unit, said second heat source being located to the opposite side of said plane from said first heat source, said heat sources being operable to heat said copy sheet to the developing temperature, and said second roller unit being closely mounted to said first roller unit to receive the copy sheet from said first roller unit whereby each copy sheet moves continuously in one direction through said developer.

2. The thermal developer of claim 1 wherein each of said heat sources includes a bar formed of a material having a high thermal conductivity and having a recess defining said heat radiating surface, and an elongated heating element mounted abutting the bar, a high temperature thin electrical insulator between the bar and the heating element, a high temperature backing insulator abutting the back side of the bar, a rigid pressure applying strip abutting said backing insulator, and means applying pressure to said strip to clamp said heating element in place, and means to maintain said bar at a selected temperature to rapidly raise said sheet to said developing temperature.

3. The thermal developer of claim 1 wherein each roller unit includes an inner heat distributing element and an outer friction material affixed as a thin outer coating to said element and adapted to frictionally grasp the copy sheet and transport said sheet, means rotatably supporting of the roller unit for rotation about a relatively fixed axis, each of said heat sources includes a heat radiating bar having a recess defining said radiating surface, said friction material being selected and constructed to establish rapid heat transfer whereby said tube functions as a heat distributing means and thereby creates a uniform hot background to said copy sheet.

4. The thermal developer of claim 3 wherein said heat distributing element is a thin metal tube and said outer friction material is in the form of a thin coating.

5. The thermal developer of claim 3 wherein thermal insulating end support members are secured to each of said roller units and heat sources to define end thermal stop walls to essentially conductive heat loss from said units and sources.

6. The thermal developer of claim 5 wherein said end members include central shaft hubs spaced from said distributing tube, a supporting shaft coupling means for rotatably locking said hubs to said shaft and for permitting limited relative axial movement of the end members and said shaft.

7. The thermal developer of claim 1 wherein each of said first and second roller units includes bias means urging the roller units and heat sources toward each other to firmly grasp the copy sheet, said roller unit engages the radiating surface in the absence of the copy sheet material, said bias means permitting relative movement in response to transport of the copy sheet therebetween to locate said unit and surface in smooth interengagement with the copy sheet.

8. The thermal developer of claim 1 wherein said heat source includes an elongated heating bar having a curved recess defining said heating surface, an elongated heating element abutting the back side of said heating bar, an insulator abutting the back side of said heating element, a rigid clamp strip abutting the back side of the insulation, and means applying clamping pressure to said clamp strip.

9. The thermal developer of claim 1 wherein each of said heat sources includes a solid metal heating bar having a recess formed in one face defining said radiating surface and having a heating means secured within the bar in the opposite face from said recess, a heat sensing bimetal means coupled to said bar for monitoring the temperature of the heat radiating surface, said bimetal means including a mounting metal plate abutting the metal bar and a bimetal element mounted adjacent said metal plate and operable to open and close a switch means and having a thermally conductive grease-like material located between the mounting plate and said metal bar and between the mounting plate and the bimetal element.

10. The thermal developer of claim 9 having end mounting brackets of a heat insulating material, floating means attaching said heating bar between said brackets and including means urging the bar into engagement with the roller unit.

11. The thermal developer of claim 10 wherein said roller units are located with the axis in a substantially common horizontal plane, a first of said heating bars being located above the corresponding roller unit and movably mounted with gravity urging the bar into engagement with the roller unit, the second of said heating bars being located beneath the corresponding roller unit and being movably mounted, and a resilient means urging the second bar upwardly into engagement with the corresponding roller unit.

12. The thermal developer of claim 11 wherein each of said roller units include a thin metal support cylinder and said friction material is a thin coating on the metal support cylinder, insulating end support caps having a coupling recess affixed to the adjacent end of said cylinder and having a central shaft hub, a metal drive shaft extends through said hubs, mounting end brackets include shaft bearing rotatably supports said shaft, slip coupling means rotatably connect the shaft to the hubs with an axial slip connection for permitting relative axial movement therebetween, and said hubs extending axially outwardly of the cylinder into close spaced relation to the end brackets for locating the roller means in alignment with said heat radiating surface.

13. The thermal developer of claim 12 wherein said metal bar is formed of aluminum, and said coating is formed of silicone.

14. A thermal developer suitable for supplying heat to a copy sheet having a thermally developable surface material for copying of original material, comprising a hollow drive roller unit including an inner heat distributing roller for rapidly distributing heat and establishing a uniform temperature throughout the length of the roller unit, said roller being formed of heat conductive metal establishing rapid heat transfer throughout the roller and having open ends, a thin outer friction material intimately attached to the outer surface of said roller, said friction material adapted to frictionally grasp said sheet and transport said sheet and simultaneously provide rapid heat transfer to said heat distributing element, a rotating support unit rotatably supporting of the roller unit for rotation about a relatively fixed axis, a heat source having a heat radiating surface substantially matching the curvature of said roller unit, means mounting said source in opposed relation to said roller unit and including means biasing the source into engagement with the roller and permitting limited movement of the source relative to the roller, said friction material being selected and constructed to establish rapid heat transfer whereby said roller functions as a heat distributing means and thereby creates a uniform hot background to said copy sheet, and said rotating support unit supporting the roller at the opposite ends and including a thermal insulating plastic end cap secured to each end of said roller and defining continuous end thermal barriers at the opposite ends of said roller to minimize heat loss from said roller through the rotating support unit.

15. The thermal developer of claim 14 wherein said heat source includes a metal bar having said recess formed in one face and having a heating means secured within the bar in the opposite face from said recess, a heat sensing means coupled to said bar for monitoring the temperature of the heat radiating surface, said heat sensing means including a movable element, a heat transfer medium of a grease-like viscosity coupling the element to the bar.

16. The thermal developer of claim 15 having end mounting brackets of a heat insulating material, means attaching said bar between said brackets, and support walls, means mounted in said brackets and in said support walls for limited movement with respect to said roller unit and including means urging the bar toward the roller unit.

17. The thermal developer of claim 16 wherein said roller unit includes a distributing metal cylinder and said friction material is a thin coating on the metal cylinder thermal, insulating end caps having a coupling recess affixed to the adjacent end of said cylinder and having a central shaft hub, a metal drive shaft extending through said hubs and said support walls and rotatably supported in said support walls, means rotatably connecting the shaft to the hubs with an axial slip connection for permitting relative axial movement therebetween, and said hubs extending axially outwardly of the cylinder into close spaced relation to the brackets for locating the roller means in alignment with said heat radiating surface.

18. A thermal developer suitable for supplying heat to a copy sheet having a thermally developable surface material for copying of original material, comprising a hollow drive roller unit including an inner heat distributing roller for rapidly distributing heat and establishing a uniform temperature throughout the length of the roller unit, a thin outer friction material intimately attached to the outer surface of said roller, said friction material adapted to frictionally grasp said sheet and transport said sheet and simultaneously provide rapid heat transfer to said heat distributing element, a shaft rotatably supporting the roller unit for rotation about a relatively fixed axis, a heat source having a heat radiating surface substantially matching the curvature of said roller unit, means mounting said source in opposed relation to said roller unit and including means biasing the source into engagement with the roller and permitting limited movement of the source relative to the roller, said friction material being selected and constructed to establish rapid heat transfer whereby said roller functions as a heat distributing means and thereby creates a uniform hot background to said copy sheet, said roller unit being supported at the opposite ends by thermal insulating end members to define end thermal barriers at the opposite ends of said roller unit and minimizes heat loss therefrom, said end members include central shaft hubs spaced from said distributing roller, a supporting shaft coupling means for rotatably locking said hubs to said shaft means and for permitting limited relative axial movement of the end members and said shaft means.

19. A reader-printer apparatus having means for projecting an image from a film carrier for selective viewing a film image and copying said image on a hard copy sheet, comprising a housing, an optical projection system for projecting the image onto the housing and including a double faced mirror movable mounted between a first position locating a first side of the mirror into image path for projecting the image onto a viewing screen and a second position for projecting the image onto copy exposure support, a source of image copy sheet material and including means to successively move portions thereof into the exposure support, a thermal developer having first and second developing stages mounted to transport the copy sheet in one continuing direction therethrough, each stage having a driver roller means nested within a heating source, the roller means of the first and second stages being mounted with the axis of the roller means in a common plane and with the heat sources of the first and second stages located to the opposite sides of said plane, and means to rotate said roller means to transport the copy sheet.

20. The apparatus of claim 19 wherein each roller means includes an inner heat distributing element and an outer friction material adapted to frictionally grasp said sheet material and transport said sheet material from said support, a heat source having a heat radiating surface substantially matching the curvature of said roller unit, said friction coating being selected and constructed to establish rapid heat transfer whereby creates a uniform hot background to said copy sheet.

21. The apparatus of claim 19 wherein said heat source is a fixed elongated heated bar structure having said recess formed in one surface, regulated heater means for rapidly heating said bar structure to raise said surface to a selected regulated temperature, said heat distributing element including a thin metal heat distributing tube and said friction material being a coating secured to the tube, and said means to move the copy sheet to developer being constructed and arranged to place the copy sheet with the exposed surface into engagement with the bar structure in said first stage and said roller unit in said second stage.

22. The apparatus of claim 19 wherein said optical projecting system includes a small mirror mounted between the image source and the double faced mirror and located to transmit the image to said first side of the double faced mirror, means to move said small mirror from said image path in response to movement of the double faced mirror to said second position.

* * * * *